United States Patent Office 3,338,349
Patented Aug. 29, 1967

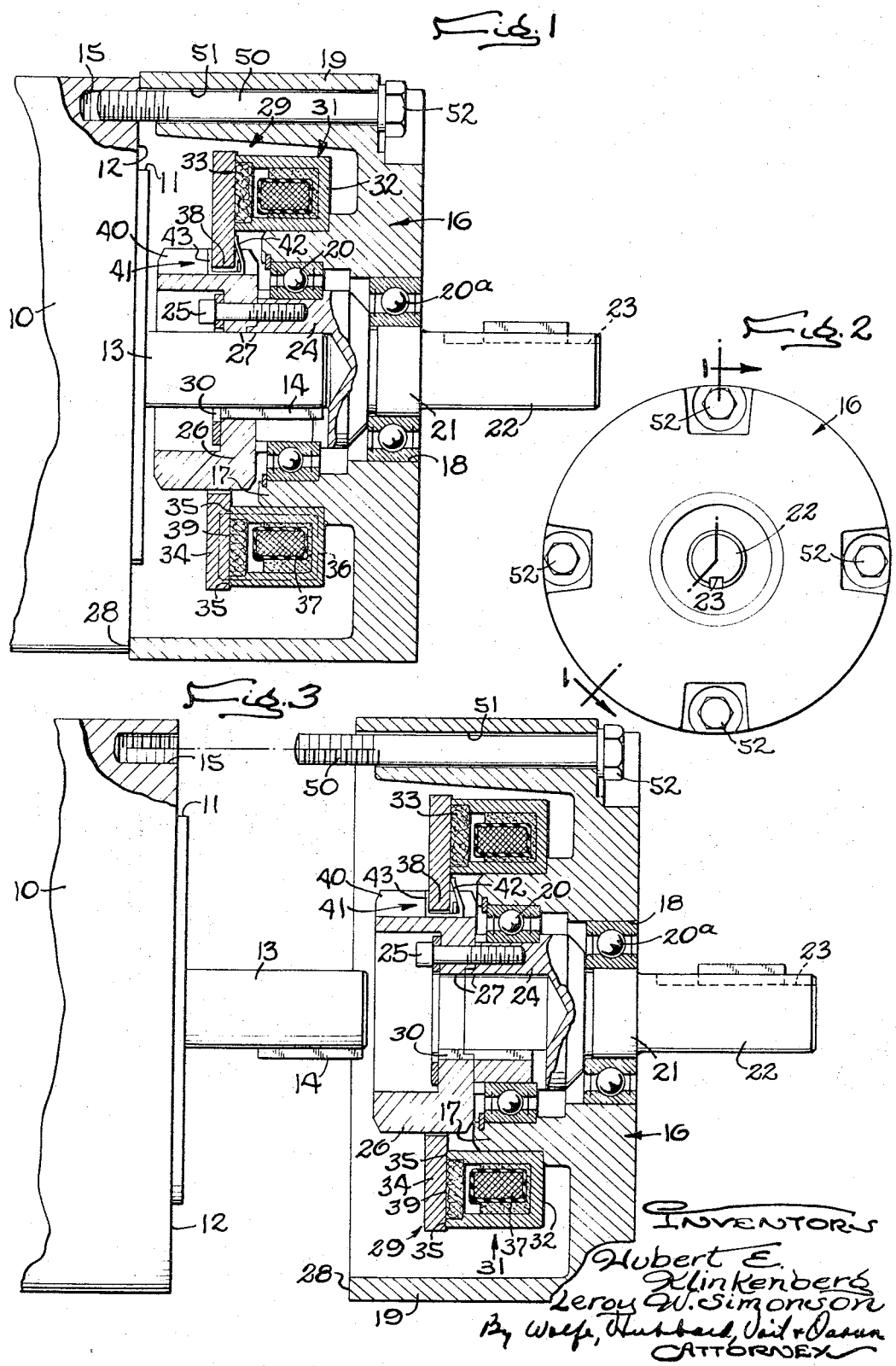

3,338,349
ELECTRIC MOTOR MOUNTED MAGNETIC FRICTION BRAKE
Hubert E. Klinkenberg and Leroy W. Simonson, Beloit, Wis., assignors to Warner Electric Brake & Clutch Company, South Beloit, Ill., a corporation of Delaware
Continuation of application Ser. No. 544,519, Apr. 22, 1966, which is a division of application Ser. No. 385,190, July 27, 1964. This application Nov. 17, 1966, Ser. No. 607,101
5 Claims. (Cl. 188—161)

This application is a continuation of our copending application Ser. No. 544,519, filed Apr. 22, 1966, which, in turn, is a division of our application Ser. No. 385,190 filed July 27, 1964 and now abandoned.

This invention relates to a self-contained magnetically energizable brake which is adapted to apply a retarding torque to the shaft of an electric motor and to be supported from the end bell thereof.

The primary object is to provide a wholly enclosed magnetic brake which becomes coupled to the motor shaft automatically as an incident to bringing its casing into abutment with and securing the same to the motor end bell.

A more detailed object is to apply the braking torque to a ring journaled in the brake casing and adapted to telescope onto and become coupled to the shaft of a motor having a shaft and end bell of a configuration standardized by the National Electrical Manufacturer's Association (NEMA).

Other objects and advantages of the invention will become apparent from the following detailed description taken in connection with the accompanying drawings, in which FIGURE 1 is a fragmentary elevational view of an electric motor equipped with a magnetic friction brake incorporating the novel features of the invention and shown as a diametrical section taken along the line 1—1 of FIG. 2.

FIG. 2 is an end view.

FIG. 3 is a view similar to FIG. 1 with the brake and motor casings separated.

In the form illustrated in the drawings, the brake embodying the present invention is especially adapted for mounting on the bell 10 on the end of the housing of an electric motor of standard construction. In end bells of the Type C type, a cylindrical male pilot surface 11 projects from a flat end 12 and is precisely concentric with the projecting end 13 of the motor shaft which is of standard size and length and equipped with a key 14 of standard dimensions. In most of the Type C NEMA end faces, the pilot surface is smaller than the circle around which threaded bolt holes 15 are spaced angularly and equidistantly.

The operating parts of the improved brake are mounted on and enclosed by a casing in the form of a ring 16 of general cup shape having an inner flange 17 defining the cup bottom having a central opening 18 therein and an outer longer flange 19, both flanges being concentric with the axis of the cup. The ring is adapted to be clamped against the end bell with the end 28 of the outer flange 19 abutting against the surface 12. Herein this is accomplished by screws 50 disposed in parallel holes 51 extending through the outer flange 19 and spaced radially and angularly to match the holes 15 in the motor end bell. The screws thread into these holes and the heads 52 are preferably set beneath the outer end surface of the casing.

Disposed within the inner flange 17 and journaled in a bearing 20 supported thereby is a tubular ring or sleeve 24, 26 which supports the rotary part of the brake at its inner end and is contoured internally to receive the projecting end portion of the motor shaft 13 and become spline coupled thereto automatically in the movement of the casing 16 axially from the position shown in FIG. 3 into abutment of the flange end 28 with the end surface 12 of the motor end bell. In such movement, the shaft end telescopes into the recess 27 in the ring and the key 14 on the shaft 13 slides into a groove 30 in the ring which herein is composed of two abutting rings 24, 26 clamped together by screws 25. The length of the casing flange 19 is such that the motor shaft 13 will enter the recess 27 and become coupled to a desired length of the key 14 as the flange 19 comes into abutment with the end bell.

Herein, the part 24 of the coupling ring 24, 26 is the enlarged end portion of a shaft 22 which projects outwardly through and beyond the bottom of the casing cup and constitutes an extension of the motor shaft which may be coupled through a key and slot 23 to a part to be driven by the motor. When the coupling ring 24, 26 is thus extended, the shaft 22 is journaled in a second bearing 20a axially spaced from the bearing 20 and disposed near the bottom end of the casing cup 16. When a separate output shaft 22 is not required, the rotary sleeve 24, 26 may be left open at its outer end and supported by the bearing 20 alone.

The end 28 of the outer flange 19 is somewhat larger than the male pilot 11 provided on a standard NEMA motor. Thus, after telescoping of the rotatable ring 24, 26 onto the motor shaft and abutment of the flange end with the motor end bell as above described, the casing 16 will be supported and located transaxially by the motor shaft free of the pilot 11. This avoids any possibility of objectionable loading of the bearings 20.

The magnetic friction brake indicated generally at 29 includes a magnet 31 fixed to the cup 16 between the flanges 17 and 19 and providing a friction surface 39 facing axially toward the open end of the cup and disposed about midway between the ends thereof. A flat armature ring 34 splined onto the inner end portion of the rotatable ring 24, 26 is adapted to be drawn into axial gripping engagement with the magnet 31 upon energization of a multi-turn winding 37 of the magnet. The latter surrounds the inner flange 17 onto which its core 32 of U-shaped cross-section is pressed or otherwise secured. The concentric inner and outer pole pieces of the core are spanned at their ends by a ring or series of segments 33 of wear resistant friction material cooperating with the end faces 35 of the pole pieces to form the friction face 39 which is disposed about midway between the ends of the cup 16.

The armature ring 34 of iron has angularly spaced and inwardly projecting radial teeth 38 fitting closely in but slidable along spline grooves 40 angularly spaced around the exterior of the ring 26 which may be composed of molded plastic material and preferably is disposed inwardly beyond the race rings of the bearing 20 and is somewhat larger than the latter. The armature is positioned axially along the grooves 40 by devices 41 which operate automatically in service use to take up wear at the friction faces of the brake and maintain a uniform gap of the desired narrow axial width between these faces when the brake is disengaged by deenergization of the magnet. These devices may take various forms including the one fully disclosed in the parent of this application. In general, the devices here shown each comprise a clip of resilient steel having upstanding flanges 42 and 43 spaced apart at their lower ends a distance greater than the thickness of the armature 34 by the width of the air gap desired to be maintained. There is one clip for each of the collar grooves 40 fitting snugly therein with the flanges thereof engaging opposite sides of the armature.

When the armature is attracted to the magnet face, it is shifted away from the short flange and against the longer flange thus bending the latter. If wear has taken place, the armature will engage the flange 42 before it does the magnet poles. As a result, the friction between the clip and the groove walls is overcome, and the armature and clip as a unit are shifted along the grooves. Then, when the magnet is deenergized, the spring 42 pushes the armature away from the magnet and the flange 42 and against the flange 43 thus establishing the gap of the desired width.

It will be apparent that the improved motor brake is a self-contained unit of simple and inexpensive construction and adapted for quick and easy assembly onto and rigid attachment to the motor end bell of standard construction. In the assembly, the motor shaft enters the recess 27 in the rotatable ring 24, 26 and becomes coupled to this ring automatically as the casing 16 is brought into end abutment with the end bell of the motor. Thereafter, it is ony necessary to aline the holes 51 in the casing with the holes 15 on the end bell and insert and tighten the screws 50. By providing for telescoping of the motor shaft into the recess 27, optimum axial compactness is achieved in the arrangement of the bearings 20 and the brake and coupling parts.

We claim as our invention:

1. An electromagnetic friction brake adapted to be mounted on an electric motor having a shaft with a key therein projecting from the motor end bell and an annular series of angularly spaced holes concentric with said shaft and extending into said end bell near the outer periphery thereof, said brake comprising a cup-shaped casing having generally cylindrical inner and outer flanges concentric with said shaft, said outer flange being longer than the inner flange and adapted to abut said motor end, and said inner flange defining a central opening in the bottom of the cup, parallel angularly spaced holes extending through said casing and adapted to register with said end bell holes and receive fastening elements for clamping the casing to said end bell, an output shaft extending through said casing opening and journaled intermediate its ends in said inner flange, the inner end of said shaft being spaced inwardly from the end of said outer flange and having an axially opening recess therein internally contoured to receive the end portion of said motor shaft in spline coupled relation as an incident to abutment of the end of said outer flange and said end bell and alinement of said holes with said motor screws holes, the other end portion of the shaft projecting through and outwardly from the center of said casing, an annular magnet disposed between said inner and outer flanges and including a magnetic core of U-shaped radial cross-section secured to said casing ring between said flanges and providing radially spaced pole faces facing axially toward the open end of the casing and disposed intermediate the ends of said outer flange, and an armature ring splined onto the inner end portion of said shaft and spanning the pole faces to form with the core a magnetic flux circuit of toroidal shape.

2. An electromagnetic friction brake adapted to be mounted on an electric motor having a shaft with a key therein projecting from the motor end bell and an annular series of angularly spaced holes concentric with said shaft and extending into said end bell near the outer periphery thereof, said brake comprising a cup-shaped casing having a central bottom opening and a generally cylindrical outer flange concentric with the cup axis and adapted to abut said end bell, parallel angularly spaced holes extending through said casing and adapted to register with said motor holes and receive fastening elements for clamping the casing against the end bell, an output shaft extending through said casing opening and journaled intermediate its ends in the cup bottom, the inner end of said shaft being spaced inwardly from the end of said outer flange and having an axially opening recess therein internally contoured to receive the end portion of said motor shaft and become spline coupled thereto as an incident to abutment of the end of said outer flange with said end bell and alinement of said casing and end bell holes, the other end portion of the shaft projecting through and outwardly from the center of said casing, an annular magnet disposed between said inner and outer flanges and including a magnetic core of U-shaped radial cross-section secured to said casing ring between said flanges and providing radially spaced pole faces facing axially toward the open end of the casing and disposed intermediate the ends of said flange, and an armature ring splined onto the inner end portion of said shaft and spanning the pole faces to form with the core a magnetic flux circuit of toroidal shape.

3. An electromagnetic friction brake adapted to be mounted on an electric motor having a shaft with a key therein projecting from the motor end bell and an annular series of angularly spaced holes concentric with said shaft and extending into said end bell near the outer periphery thereof, said brake comprising a generally cup-shaped casing having generally cylindrical inner and outer flanges concentric with said shaft, said outer flange being longer than the inner flange and adapted to abut said motor end, and said inner flange defining a central opening in the bottom of the cup, parallel angularly spaced holes extending through said casing and adapted to register with said end bell holes and receive fastening elements for clamping the end of said outer flange to said end bell, a tubular ring disposed in said casing opening and journaled intermediate its ends in said inner flange, said ring opening axially and being internally contoured to receive and telescope with the end portion of said motor shaft in spline coupled relation automatically as an incident to abutment of the end of said outer flange and said end bell and alinement of said holes with said motor holes whereby the final transaxial position of said ring and said casing is determined solely by said motor shaft, an annular magnet disposed between said inner and outer flanges and including a magnetic core of U-shaped radial cross-section secured to said casing between said flanges and providing radially spaced pole faces facing axially toward the open end of the casing and disposed intermediate the ends of said outer flange, and an annular armature encircling and splined onto the inner end portion of said ring and spanning said pole faces to form with said core a magnetic flux circuit of toroidal shape.

4. An electromagnetic friction brake as defined in claim 3 in which said ring is journaled in a bearing supported by said inner flange and disposed in the plane of said magnet, and said armature is supported on an end portion of said ring projecting axially beyond said bearing.

5. An electromagnetic friction brake as defined in claim 3 in which the motor shaft, when said casing and end bell are in abutment projects axially through said magnet core.

References Cited
UNITED STATES PATENTS 2,970,681    2/1961    Timmcke _____ 188—164 X DUANE A. REGER, *Primary Examiner.*